(12) United States Patent
Sakalis et al.

(10) Patent No.: US 11,163,576 B2
(45) Date of Patent: Nov. 2, 2021

(54) SYSTEMS AND METHODS FOR INVISIBLE SPECULATIVE EXECUTION

(71) Applicant: ETA SCALE AB, Uppsala (SE)

(72) Inventors: Christos Sakalis, Uppsala (SE);
Stefanos Kaxiras, Uppsala (SE);
Alberto Ros, Cartagena (ES);
Alexandra Jimborean, Uppsala (SE);
Magnus Själander, Ostersund (SE)

(73) Assignee: ETA SCALE AB, Uppsala (SE)

( * ) Notice: Subject to any disclaimer, the term of this patent is extended or adjusted under 35 U.S.C. 154(b) by 0 days.

(21) Appl. No.: 16/825,399

(22) Filed: Mar. 20, 2020

(65) Prior Publication Data

US 2020/0301712 A1 Sep. 24, 2020

Related U.S. Application Data

(60) Provisional application No. 62/821,020, filed on Mar. 20, 2019.

(51) Int. Cl.
*G06F 9/38* (2018.01)
*G06F 9/30* (2018.01)
(Continued)

(52) U.S. Cl.
CPC ........ *G06F 9/3842* (2013.01); *G06F 9/30047* (2013.01); *G06F 9/30054* (2013.01); *G06F 12/0808* (2013.01); *G06F 12/0811* (2013.01)

(58) Field of Classification Search
None
See application file for complete search history.

(56) References Cited

U.S. PATENT DOCUMENTS 6,112,019 A * 8/2000 Chamdani ............. G06F 9/3836
712/214
7,774,531 B1 * 8/2010 Karlsson ............... G06F 9/3842
710/220

(Continued)

OTHER PUBLICATIONS

Bonneau et al., "Cache-Collision Timing Attacks Against AES," Cryptographic Hardware and Embedded Systems, Lecture Notes in Computer Science, vol. 4249, Springer Berlin Heidelberg 2006.

(Continued)

*Primary Examiner* — Hyun Nam
(74) *Attorney, Agent, or Firm* — Patent Portfolio Builders PLLC

(57) ABSTRACT

A system and method for efficiently preventing visible side-effects in the memory hierarchy during speculative execution is disclosed. Hiding the side-effects of executed instructions in the whole memory hierarchy is both expensive, in terms of performance and energy, and complicated. A system and method is disclosed to hide the side-effects of speculative loads in the cache(s) until the earliest time these speculative loads become non-speculative. A refinement is disclosed where loads that hit in the L1 cache are allowed to proceed by keeping their side-effects on the L1 cache hidden until these loads become non-speculative, and all other speculative loads that miss in the cache(s) are prevented from executing until they become non-speculative. To limit the performance deterioration caused by these delayed loads, a system and method is disclosed that augments the cache(s) with a value predictor or a re-computation engine that supplies predicted or recomputed values to the loads that missed in the cache(s).

16 Claims, 16 Drawing Sheets

(51) Int. Cl.
*G06F 12/0808* (2016.01)
*G06F 12/0811* (2016.01)

(56) References Cited

U.S. PATENT DOCUMENTS

| | | | | |
|---|---|---|---|---|
| 10,394,716 | B1* | 8/2019 | Piry | G06F 12/0871 |
| 2011/0208915 | A1* | 8/2011 | Bannon | G06F 9/3017 |
| | | | | 711/122 |
| 2016/0162293 | A1* | 6/2016 | Hooker | G06F 1/3206 |
| | | | | 712/216 |
| 2016/0179586 | A1* | 6/2016 | Wang | G06F 9/3834 |
| | | | | 711/125 |
| 2017/0177365 | A1* | 6/2017 | Doshi | G06F 9/30087 |
| 2018/0121273 | A1* | 5/2018 | Fortino | G06F 9/3863 |

OTHER PUBLICATIONS

Irazoqui et al., "Cross Processor Cache Attacks," Proceedings of the 11th ACM on Asia Conference on Computer and Communications Security, May 2016, pp. 353-364.
Kim et al., "Understanding Scheduling Replay Schemes," 10th International Symposium on High Performance Computer Architecture (HPCA '04), Feb. 14-18, 2004, Madrid, ES.
Kocher et al., "Spectre Attacks: Exploiting Speculative Execution," 2019 IEEE Symposium on Security and Privacy (SP), May 19-23, 2019, San Francisco, CA, US.
Lipp et al., "Meltdown," arXiv:1801,01207v1 [cs.CR], Jan. 3, 2018.
Liu et al., "Last-Level Cache Side-Channel Attacks are Practical," 2015 IEEE Symposium on Security and Privacy, May 17-21, 2015, San Jose, CA, US.
Martin et al., "Correctly Implementing Value Prediction in Microprocessors that Support Multithreading or Multiprocessing," 34th Annual ACM/IEEE International Symposium on Microarchitecture, Dec. 3-5, 2001, Austin, TX, US.
Qureshi, "CEASER: Mitigating Conflict-Based Cache Attacks via Encrypted-Address and Remapping," 51st Annual IEEE/ACM International Symposium on Microarchitecture (MICRO), Oct. 20-24, 2018, Fukuoka City, JP.
Ros et al., "Non-Speculative Load-Load Reordering in TSO," ISCA '17, Jun. 24-28, 2017, Toronto, ON, CA.
Standard Performance Evaluation Corporation (SPEC), "SPEC CPU Benchmark Suite," www.spec.org/osg/cpu2006/, retrieved Mar. 20, 2020.
Trippel et al., "MeltdownPrime and SpectrePrime: Automatically-Synthesized Attacks Exploiting Invalidation-Based Coherence Protocols," arXiv:1802.03802v1 [cs.CR], Feb. 11, 2018.
Tullsen et al., "Storageless Value Prediction Using Prior Register Values," Proceedings of the 26th International Symposium on Computer Architecture, May 4, 1999, Atlanta, GA, US.
Yan et al., "InvisiSpec: Making Speculative Execution Invisible in the Cache Hierarchy," Proceedings of the 51st Annual IEEE/ACM International Symposium on Microarchitecture (MICRO), Oct. 20-24, 2018, Fukuoka City, JP.
Karom et al., "FLUSH+RELOAD: a High Resolution, Low Noise, L3 Cache Side-Channel Attack," 23rd USENIX Security Symposium, Aug. 20-22, 2014, San Diego, CA, US.

* cited by examiner

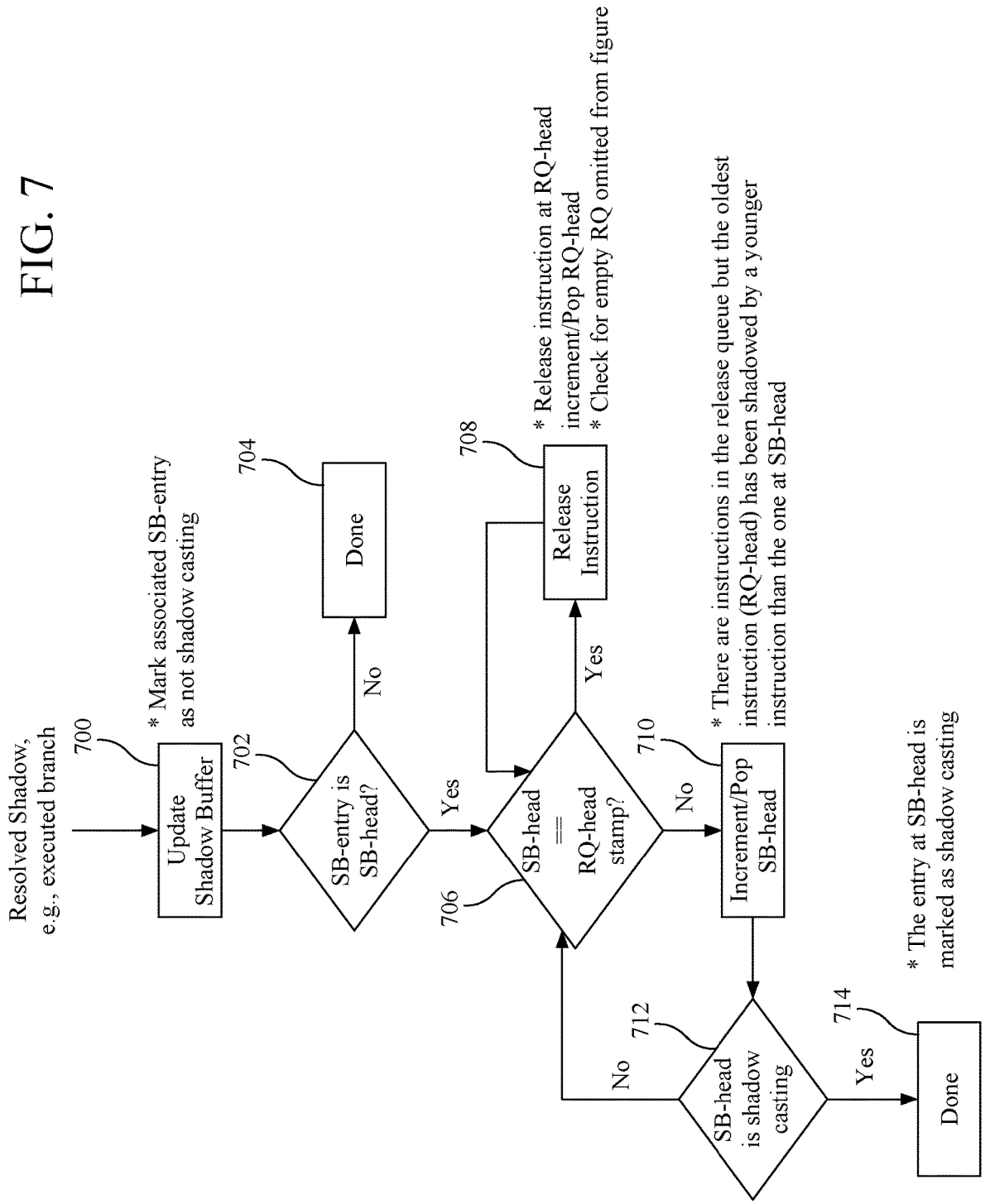

SYSTEMS AND METHODS FOR INVISIBLE SPECULATIVE EXECUTION

RELATED APPLICATION

The present application is related to, and claims priority from, U.S. Provisional Patent Application 62/821,020, filed Mar. 20, 2019, entitled "System and Method for Invisible Speculative Execution through Selective Delay and Value Prediction" to Christos Sakalis, Stefanos Kaxiras, Alberto Ros, Alexandra Jimborean, and M. Själander (Sjalander) the disclosure of which is incorporated herein by reference.

TECHNICAL FIELD

Embodiments described herein relate in general to processor security and, more particularly, to an approach for hiding the memory system effects of speculative execution.

BACKGROUND

Speculative execution, the base on which modern high-performance general-purpose CPUs are built on, has recently been shown to enable a slew of security attacks. All of these attacks are centered around a common set of behaviors: during speculative execution, the architectural state of the system is kept unmodified, until the speculation can be verified. In the event that a misspeculation occurs, then anything that can affect the architectural state is reverted (squashed) and re-executed correctly. However, the same is not true for the microarchitectural state. Normally invisible to the user, changes to the microarchitectural state can be observed through various side-channels, with timing differences caused by the memory hierarchy being one of the most common and easy to exploit. The speculative side-channels can then be exploited to perform attacks that can bypass software and hardware checks in order to leak information. These attacks include Spectre and Meltdown which are further discussed below.

Such side-channel attacks that rely on shared microarchitectural state and behavior to leak information have been known to the architecture and the security communities for years. In particular, side-channel attacks on the cache system have been practically demonstrated in many forms for the level-one cache (L1) (when the attacker can share the same core as the target), the shared last-level cache (LLC) (when the attacker can share the LLC), and the coherence protocol (when the attacker can simply be collocated in the same system, under a single coherence domain, with the target).

However, a new class of side-channel attacks, Spectre and Meltdown, attack speculation, which is one of the fundamental techniques for achieving high performance. As far as the instruction set architecture (ISA) and the target program are concerned, leaking the information across a covert side-channel is not illegal because it does not affect the functional, architectural behavior of the program. The stealthy nature of a speculative side-channel attack is based on the microarchitectural state being changed by speculation even when the architectural state is not.

Side-channel attacks based on the position of a cache line in the cache (e.g., Flush+Reload or Prime+Probe attacks) can be confronted with techniques such as randomization or encryption of addresses. Solutions that can provide strong security guarantees for such attacks have appeared. Randomization and cache isolation-based solutions do not protect against attacks originating from within the same execution context, such as some variants of Spectre.

In a paper, Yan et al. propose an approach, referred to as InvisiSpec, to hide changes in microarchitectural state due to speculation. InvisiSpec makes the accesses of a speculative load invisible in the cache hierarchy (by not changing cache and coherence state) and subsequently verifies correctness and makes changes in the memory hierarchy with a visible access when speculation is validated as correct. If the speculation fails to validate, the invisible access (although it occurred and consumed system resources, e.g., bandwidth, and energy) leaves no trace behind.

While Yan et al. provide a solution to overlap even the visible accesses of the loads, the simple fact that the accesses to the memory hierarchy are effectively doubled carries a non-trivial performance and energy cost.

Accordingly, it would be desirable to provide systems and methods which enable invisible speculative execution with improved performance and energy costs.

SUMMARY

According to an embodiment, a processing system capable of speculative instruction execution includes a processor; a cache hierarchy of one or more levels and one or more cache memories per level; a memory system that supplies data to and receives data from the cache hierarchy and the processor; wherein the processor is connected to the first level of the cache hierarchy for loading and storing data; and wherein a memory accessing instruction which is speculatively issued for execution by the processor accesses the data without causing any change in a state of the cache hierarchy if the data are cached in a first level cache, or if the data become cached in the first level cache via another request not caused by said instruction; and wherein if the data are not cached in the first level cache, the memory accessing instruction, requests the data, no earlier than a time when said memory access instruction becomes non-speculative, and causes a miss in the first-level cache which is serviced by a remainder of the cache hierarchy or memory.

According to another embodiment, a method for managing a cache memory system includes tracking a speculative status of a first memory accessing instruction being executed toward the cache memory system; and making status changes to said cache memory system associated with execution of a second memory accessing instruction which follows the first instruction in a reorder buffer once the speculative status of the first memory accessing instruction is resolved.

According to another embodiment, a processing system capable of speculative execution includes a processor; a cache hierarchy of one or more levels and one or more cache memories per level; a memory system that supplies data to and receives data from the cache hierarchy and the processor; wherein the processor is connected to the first level of the cache hierarchy for loading and storing data; and wherein before a first instruction is speculatively issued by the processor for execution, the first instruction is associated with a second instruction; the second instruction being a youngest instruction in an instruction window that is not retired and is capable of squashing the first instruction; and the first instruction is marked unsafe to execute and the second instruction is marked as shadow-casting; and wherein when the oldest shadow casting instructing is no longer capable of squashing younger instructions, the association of unsafe instructions to said oldest shadow-casting instruction is checked and said oldest shadow casting instruction is unmarked as shadow casting and if an association exists between an unsafe instruction and said oldest shadow casting instruction, the unsafe instruction is marked as safe to execute.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 7 is a flowchart illustrating how resolved shadows are handled according to an embodiment.

DETAILED DESCRIPTION

Figure 1:
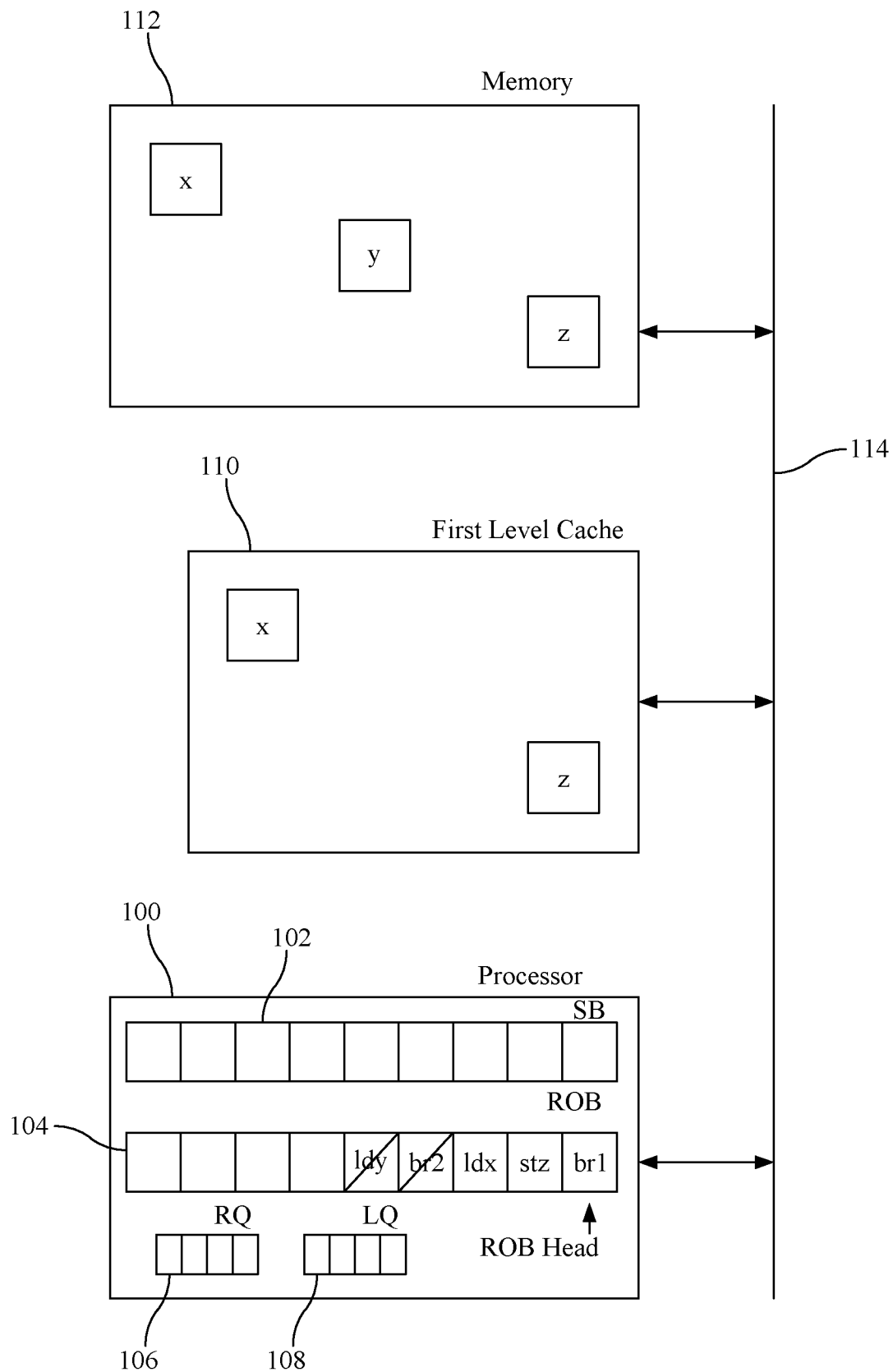
FIG. 1 depicts an example of a processing system according to an embodiment.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of multiprocessor or multicore systems and structures. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments, systems and methods are disclosed for hiding the microarchitectural state-changes caused by speculative execution in the memory hierarchy during speculation. Accesses that hit in the cache(s) are allowed to proceed under speculation. Microarchitectural changes in the cache state are prevented until after the speculation has been verified. Such microarchitectural changes can include, for example, contents of cache lines, replacement algorithm information, updating of the prefetcher, etc. Some embodiments track the speculation status of instructions and determine the earliest point that instructions become non-speculative. Some embodiments also prevent stalls by value predicting the loads that miss in the cache(s). Value prediction, though speculative, constitutes an invisible form of speculation, not seen outside the core.

According to an embodiment, a delay mechanism hides speculative accesses to the cache that miss, and recovers a significant portion of the performance and energy consumption cost without having to make a double access, one during speculation and one after speculation to verify the first one and make the microarchitectural effects visible. To issue just a single access per load one embodiment ensures that the load is non-speculative, otherwise it exposes speculative side-effects. Delaying all loads until they are non-speculative degrades performance.

In one embodiment, speculative loads that hit in the cache(s) are allowed to proceed and use the accessed value, without modifying any of the states (e.g., replacement state) or triggering any memory hierarchy functionality (e.g., prefetches) at that time. This keeps speculative hits invisible. A speculative load that misses in the cache is delayed until the earliest time it becomes non-speculative, that is, cannot be squashed by an earlier instruction, and is guaranteed to retire.

In one embodiment a speculative shadow tracking mechanism determines the earliest time an instruction becomes non-speculative, i.e., cannot be squashed by an older in program order instruction. A speculative shadow is cast on younger (in program order) instructions, by any instruction that can potentially squash all younger in program order instructions. The shadow tracking mechanism determines when a load, or in the general case when any instruction, is not covered by any speculative shadow cast by any older instruction.

In another embodiment, speculative loads that miss in the cache(s) use value prediction or value re-computation (from cached instructions) instead of sending a request deeper in the memory hierarchy. Value prediction is invisible to the outside world, thereby enabling the load to proceed with a value but keeping its speculation invisible. At the earliest time when the load is non-speculative and can no longer be squashed by an older instruction (or as close to the earliest time as is practically possible), a normal read request is issued to the memory system that fetches the actual value. At that point, irrespective of whether the value prediction was correct or not, the access is non-speculative and cannot be squashed. At this point the memory hierarchy state is modified.

Embodiments described herein thus describe approaches where only one single request per load traverses the memory hierarchy and fetches data. To validate value prediction such embodiments serialize or overlap non-speculative requests depending on the memory model. Value prediction or value re-computation reduces the cost of waiting for a load to become non-speculative.

For correctness purposes, the architectural side-effects of speculatively executed instructions remain hidden until the speculation can be verified. If a misspeculation is detected, the instructions following the misspeculation point—also referred to as transient instructions—are squashed and execution is restarted from the misspeculation point. In practice, on modern out-of-order execution (OoO) cores, all instructions are considered speculatively executed until they reach the head of the reorder buffer (ROB). This alleviates the need to keep track of which instructions are speculative, reducing the hardware cost and complexity. However, in order to achieve high performance while hiding the microarchitectural side-effects of speculatively executed instructions, a more fine-grain approach is useful: during dispatch, instructions with potential to cause a misspeculation cast a speculative shadow to all the instructions that follow. For example, a branch with an unresolved condition or unknown target address casts a shadow to all instructions that follow it because if the branch is mispredicted, the instructions that follow it will have to be squashed. Herein, the instructions under such shadows are referred to as (speculatively) shadowed instructions. As soon as the condition and the branch target are known, the speculation can be verified, and the shadow is lifted. Types of shadows include but are not limited to the following.

According to one embodiment, any instruction which is speculative can cast a shadow over other instructions which are queued behind it (in program order) in a reorder buffer and all shadows are treated in the same way. According to other embodiments different speculative instructions can cast different types of shadows such that one can selectively adjust the mechanism to consider only some of the speculative shadows and not others—this provides a tradeoff between security and loss of performance—the fewer types of shadows which are accounted for the less is the security coverage but also the less is the performance loss. Below are some examples of different types of shadows which can be defined according to some embodiments. However those skilled in the art will appreciate that other types of shadows could be defined for other types of memory operations.

The E-Shadow: E-Shadows are cast by memory operations with unknown addresses, arithmetic operations, and any other instructions that can cause an exception. The shadow starts when the instruction is dispatched and ends when the absence of an exception can be verified. For memory operations, one can check for exceptions once the address translation has completed and the permissions have been verified. For arithmetic and other instructions that throw exceptions on invalid inputs, checking can be done as soon as the instruction has been executed. Under systems where precise exceptions are not available, this shadow can potentially be ignored, as an exception does not guarantee that the instructions that follow it will not be committed successfully.

The C-Shadow: C-Shadows are cast by control flow instructions, such as branches and jumps, when either the branch condition or the target address are unknown or have been predicted but not yet verified. The shadow starts when the control flow instruction enters the ROB, and ends when the address and the condition have been verified.

The D-Shadow: D-Shadows are cast by potential data dependencies through stores with unresolved addresses (read-after-write dependencies). Loads can speculatively bypass stores and execute out of order, but they might be squashed if it is later discovered that a store points to the same address as that of a speculatively executed loads. The shadow starts when the store enters the ROB and ends when the address is resolved, akin to the E-Shadow for memory operations.

The M-Shadow: Under certain memory models (e.g., total store order—TSO), the observable memory order of loads needs to be conserved. If the execution of an older load is delayed then younger loads are allowed to execute speculatively, but they might be squashed if an invalidation is received, hence causing the M-Shadow. The shadow starts when the older load enters the ROB, and ends when it is executed. While there is an overlap with the E-Shadows, the M-Shadow extends further, as the E-Shadow can be lifted after the permission checks. The M-Shadows may be ignored under more relaxed memory models, such as release consistency (RC).

Prior to illustrating how shadows are cast and removed according to various embodiments, an architecture of a system which can be used to track shadows is illustrated in FIG. 1. Therein, one or more processors (cores) 100 execute program instructions, some of which are susceptible to the attacks described above. Such instructions are referred to herein as "unsafe" instructions. Embodiments described herein enable systems to selectively protect program execution against attacks that are designed to take advantage of the speculative nature of the unsafe instructions. Since such protection involves a delay in changing various attributes associated with the processing system, this comes with a delay (performance) penalty albeit one which is much less than the conventional protection schemes described above. Thus embodiments described herein enable the protection to be selectively applied to different classes of unsafe instructions to enable a balance to be struck between protection and performance. The at least one processor 100 includes (or has access to) several buffers and queues which are relevant to these embodiments including a shadow buffer (SB) 102, a reorder buffer (ROB) 104, a release queue (RQ) 106 and a load queue (LQ) 108. The operation of these buffers and queues in the context of the embodiments is described below.

The system shown in FIG. 1 also includes a first level (L1) cache 110 and the rest of the memory system 112, which may simply be a main memory or may also include other levels of cache memory, e.g., L2, L3, L4, etc. All of these elements are communicatively interconnected by a bus or similar interconnect device 114. Some systems may also include a smaller L0 cache and embodiments described herein are also applicable to such systems.

Figure 2A:
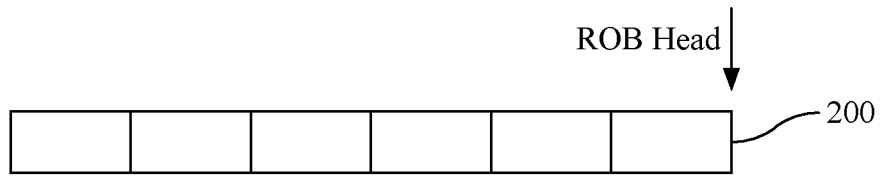
FIGS. 2(a)-2(g) graphically depict the casting and removal of shadows according to an embodiment.
Figure 2B:
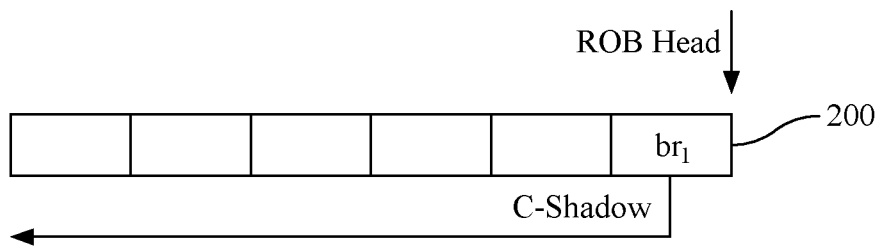
Figure 2C:
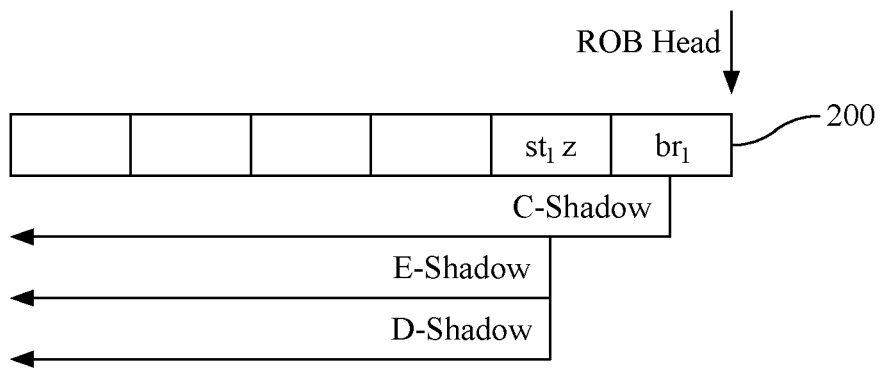

FIGS. 2(a)-2(g) show in a graphical sense how instructions cast speculative shadows over younger instructions and how such shadows are removed when instructions become non-speculative according to an embodiment to achieve the aforedescribed functionality of the embodiments. Initially, FIG. 2(a) shows an empty reorder buffer (ROB) 200 without any instructions. FIG. 2(b) depicts the ROB 200 with a new speculative branch (br1) instruction at its head, casting a C-shadow on the rest of the buffer entries (currently empty). FIG. 2(c) shows ROB 200 with a new speculative store instruction (st1) following the previously inserted branch instruction br1. The store instruction st1 is casting an E- and a D-shadow on the buffer entries (currently empty) which follow it. The store instruction st1 is shadowed by the C-shadow cast by the previous inserted branch instruction br1.

Figure 2D:
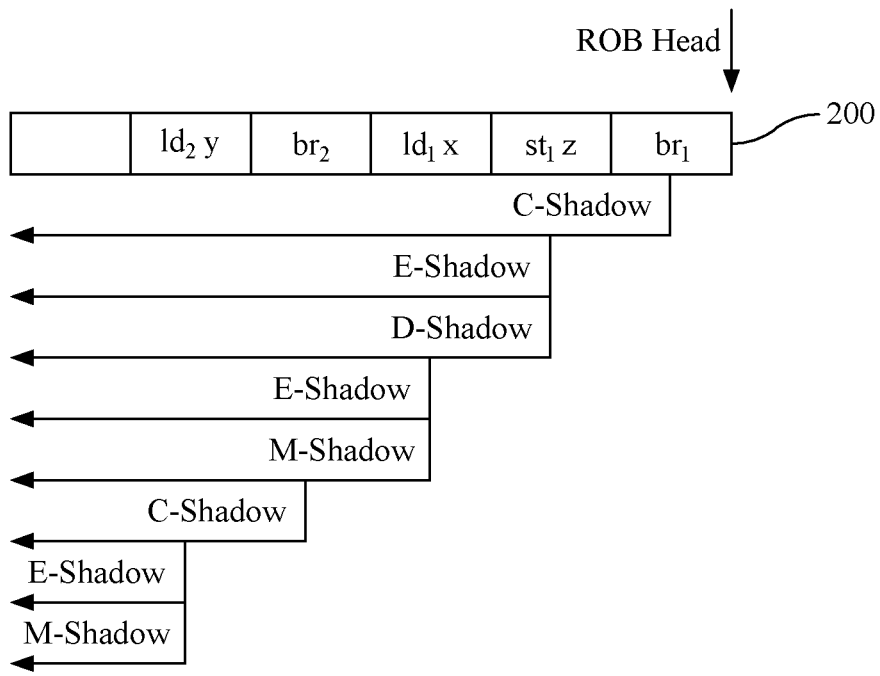

FIG. 2(d) depicts the ROB 200 with three additional new instructions, a speculative load (ld1), a speculative branch (br2), and a speculative store (ld2). The speculative loads are casting E- and M-Shadows and the speculative branch is casting a C-shadow. All the new instructions are shadowed by the previously inserted branch (ld1, C-shadow) and store (st1, E-Shadow, D-Shadow) instructions. Each new instruction is also shadowed by the shadows of the new instructions that precede it in the ROB 200.

Figure 2E:
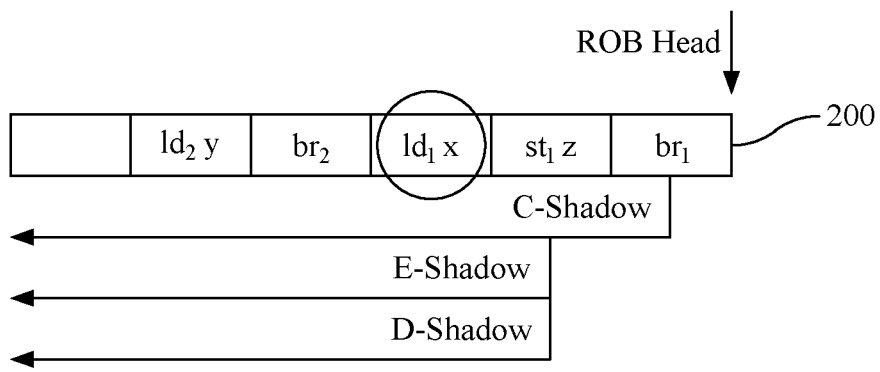
Figure 2E:
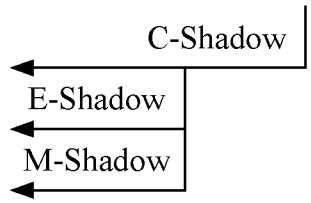

FIG. 2(e) depicts the ROB 200 once the shadows cast by the first load instruction (ld1), i.e., the E-Shadow and M-Shadow, have been resolved. The instructions that proceed the load instruction ld1 remain under the remaining shadows cast by the instructions that precede them, e.g., in this example the C-shadow cast by branch instruction br2 remains unresolved relative to ld2 and the empty entry at the tail of ROB 200 remains under the E-shadow and M-shadow cast by ld2.

Figure 2F:
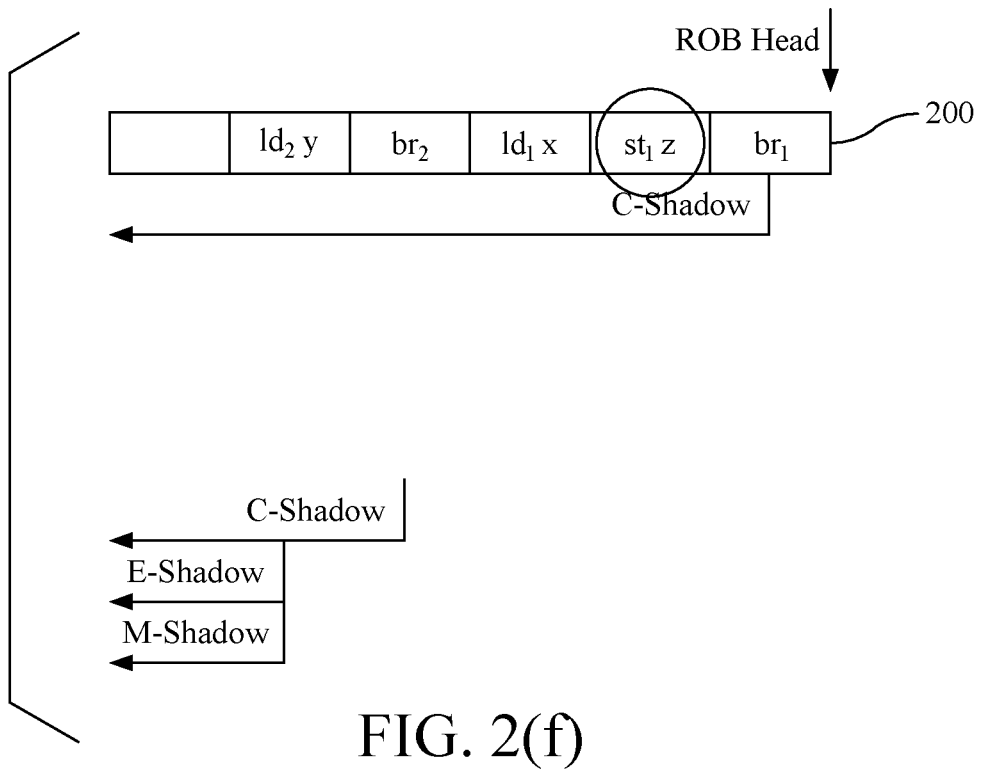

FIG. 2(f) depicts the ROB 200 once the shadows cast by the first store instructions (st1) has been resolved. The instructions that proceed the store instruction st1 remain under the remaining shadows cast by the instructions that precede them.

Figure 2G:
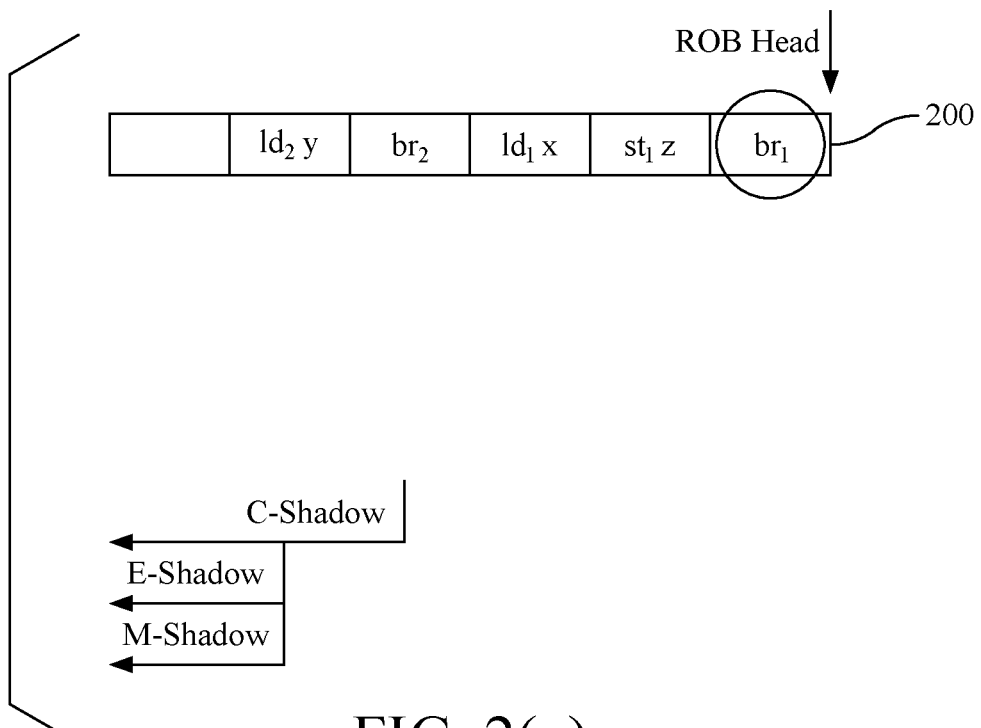

FIG. 2(g) depicts the ROB 200 once the shadow cast by the first branch (br1) has been resolved. The store (st1), first load (ld1), and second branch (br2) instruction are no longer under a shadow, as all shadows preceding them have been resolved. The second load instruction (ld2) remains under the shadow cast by the second branch instruction (br2).

At the point in time illustrated in FIG. 2(g), the micro-architectural state associated with the memory system can be updated relative to changes associated with the execution of the st1, ld1 and br2 instructions (but not the ld2 instruction) such that changes in the memory hierarchy with reflect a visible access when speculation is validated as correct.

Having seen in FIGS. 2(a)-2(g) a graphical depiction of the use of shadows to control revealing memory accesses to points in time when the speculation associated with each instruction has been fully validated, the discussion now turns to an example of a shadow buffer structure which can be used to track the shadow state of each instruction in the ROB 200. To efficiently delay a load for the minimum necessary time, or to know when a value-predicted load can be validated, a system and method is disclosed herein to determine when a load is no longer covered by a speculative shadow.

In one embodiment a determination is made as to whether the oldest, in program order, shadow-casting instruction is older than the load in question. Shadows are tracked in a FIFO shadow buffer (SB). This structure only needs to maintain a single bit per instruction. Shadow-casting instructions are entered into the shadow buffer in the order they are dispatched. Once an instruction no longer causes a shadow, e.g., once a branch has been resolved, then the SB entry is updated. Only when an instruction reaches the head of the SB and no longer casts a shadow does it get removed from the SB. This assures that the oldest shadow-casting instruction is always at the head of the SB and that instructions exit the SB in program order. A detailed example of a shadow buffer operating in conjunction with other buffers to track an instructions speculative status is provided below with respect to FIGS. 3(a)-3(h).

The following example assumes the code being queued for execution in the ROB 200:

LD0: ld r2 [r1]
BR1: br r2 #0024
LD2: ld r6 [r3]
LD3: ld r3 [r3]
BR4: br r4 #0096
LD5: ld r1 [r5]

FIGS. 3(a)-3(h) show an example of how the shadows are tracked when executing the code above. In one embodiment, the shadow buffer (SB) 300 is implemented as a circular buffer; to avoid using index 0 and 1 for all the structures in the example it is assumed that previous executions have left the SB empty with its head and tail set at 3. In one embodiment, the ROB release queue 302, and load queue 304 are also implemented as circular buffers such that an entry of these structures can always be identified by its index. The head and tail pointers of the reorder buffer 306, release queue 302, and load queue 304 are not shown in FIGS. 3(a)-3(h) to simplify the illustration.

In one embodiment, the SB 300 has as many entries as the ROB 306 and the release queue 302 has as many entries as the load queue 304 to avoid any structural hazards. In other embodiments the area overhead is reduced by optimizing these structures based on the likelihood of how many instructions cause shadows and how many shadowed loads exist. The example shows a number of steps to clearly illustrate the functionality. Many of these operations can be performed in parallel, similar to how multiple instructions can be committed from the ROB in a single cycle. Without loss of generality, to further simplify the example, only branches cast shadows, i.e., the E- and M-Shadows of the loads are not considered in this example. The example develops as a sequence of eight (plus one not shown) steps.

Figure 3A:
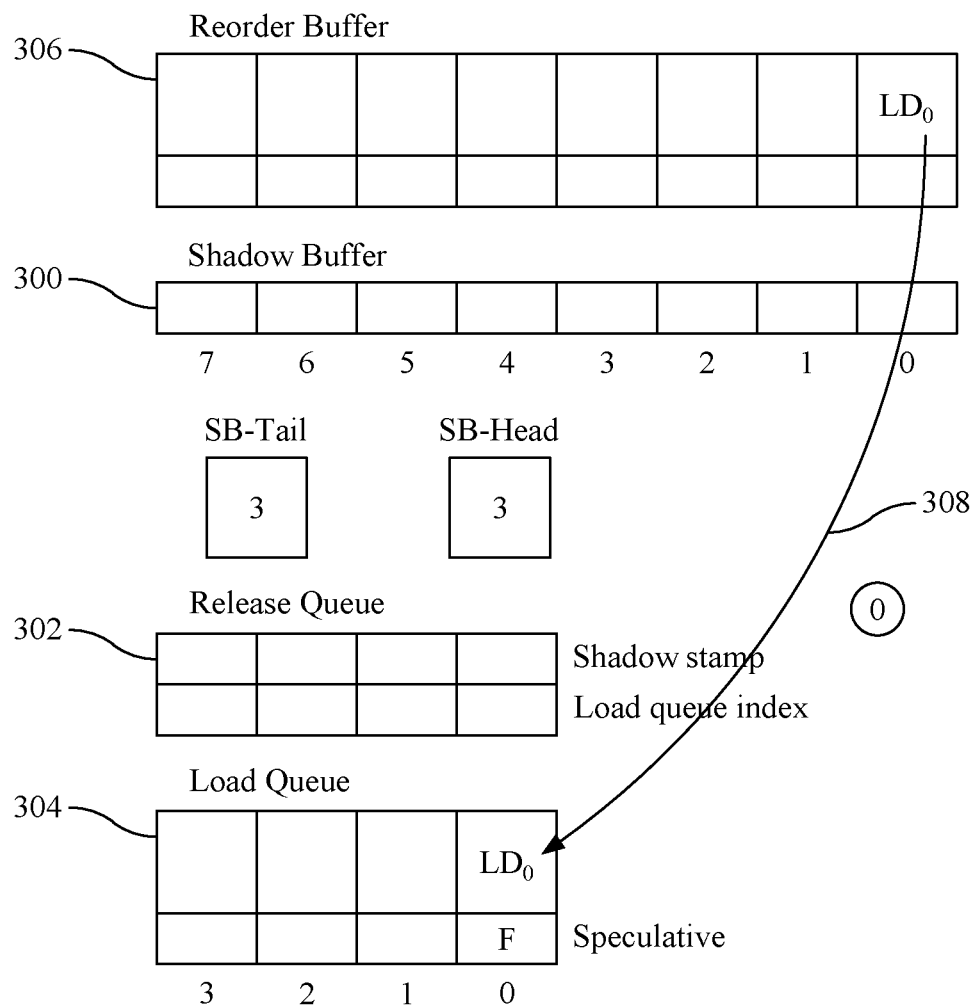
FIGS. 3(a)-3(h) illustrate the status of different buffers and queues used to track a speculative status of program instructions via the casting and removal of shadows according to an embodiment.
Figure 3B:
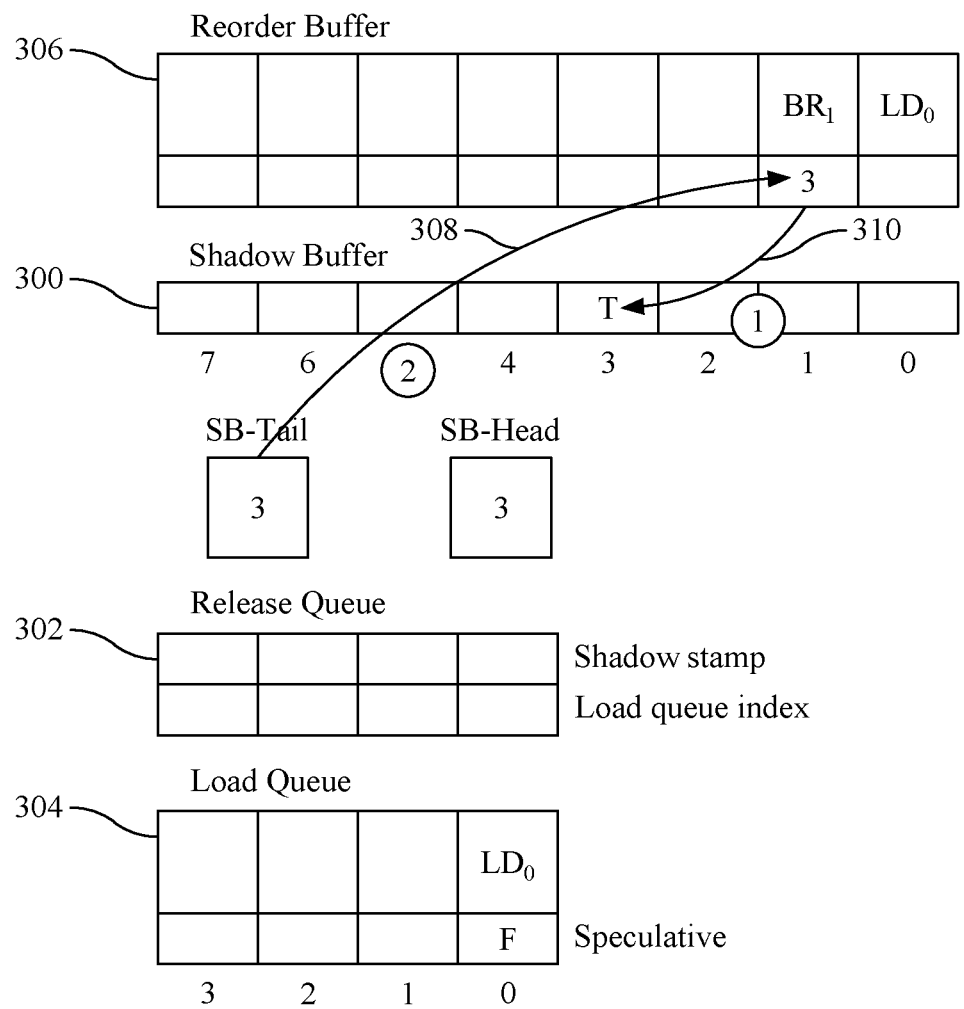
Figure 3C:
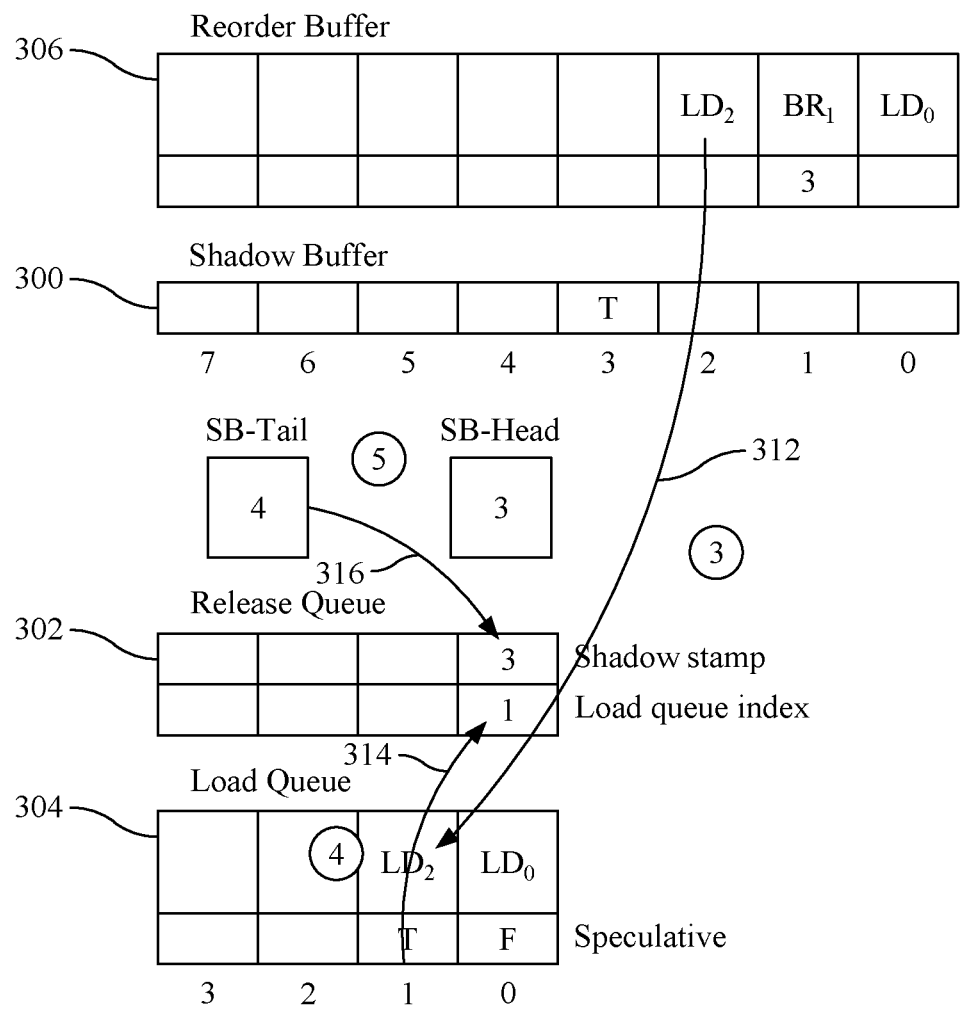

1. When the first load (LD0) enters the ROB 306 the SB 300 is empty (SB-Head==SB-Tail), indicating that there are no shadow-casting instructions and that the load can be normally executed as seen in FIG. 3(a) and arrow 308.

2. The branch (BR1) causes a shadow until it has been resolved and is, therefore, inserted into the SB 300 (FIG. 3(b), arrow 310. The ROB 306 entry of the branch is marked with the index of the SB 300 entry, i.e., the SB-Tail (FIG. 3(b), arrow 310). The SB-Tail is then incremented.

3. When the second load (LD2) enters the ROB 306 the SB 300 is no longer empty and the load LD2 is therefore shadowed. The load LD2 is still entered into the load queue 304 but it is marked as speculative (FIG. 3(c), arrow 312, value "T"). The load LD2 is also entered into the release queue 302 (arrow 314) where its index in the load queue 304 and the youngest shadow-casting instruction (identified by SB-Tail minus one) are marked.

Figure 3D:
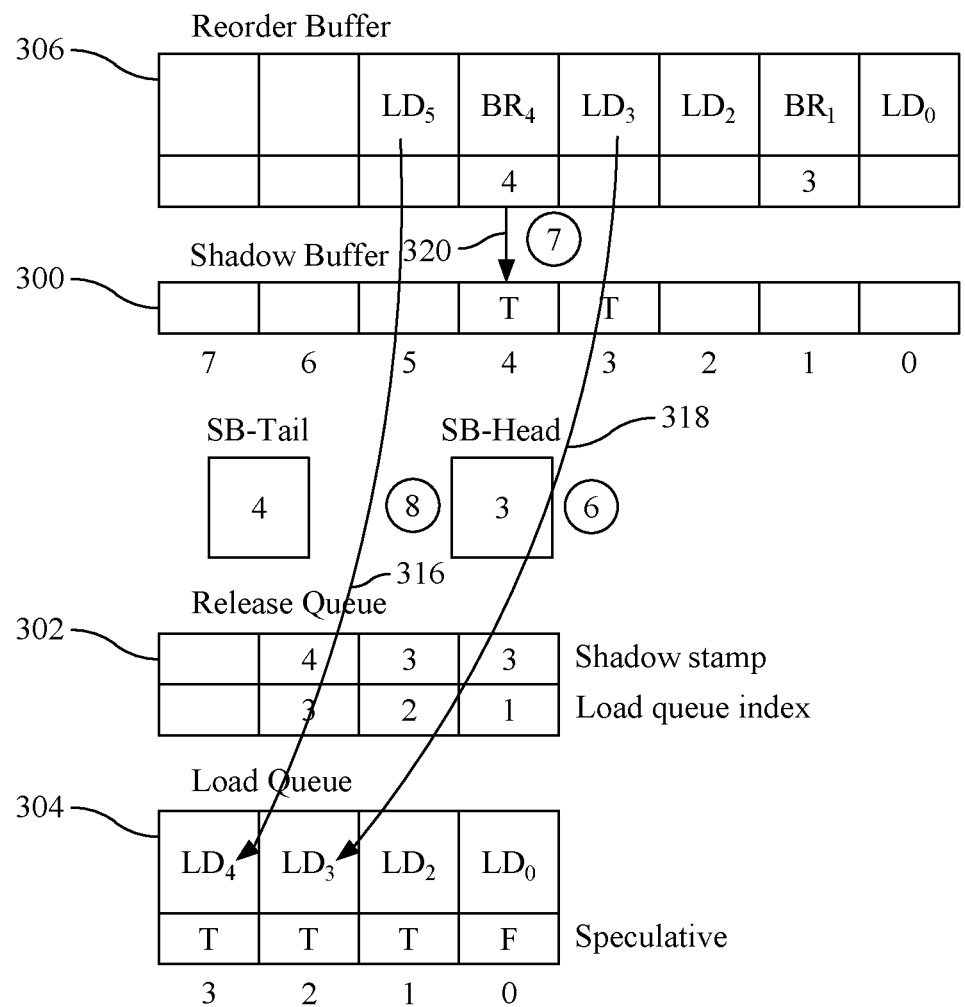
Figure 3E:
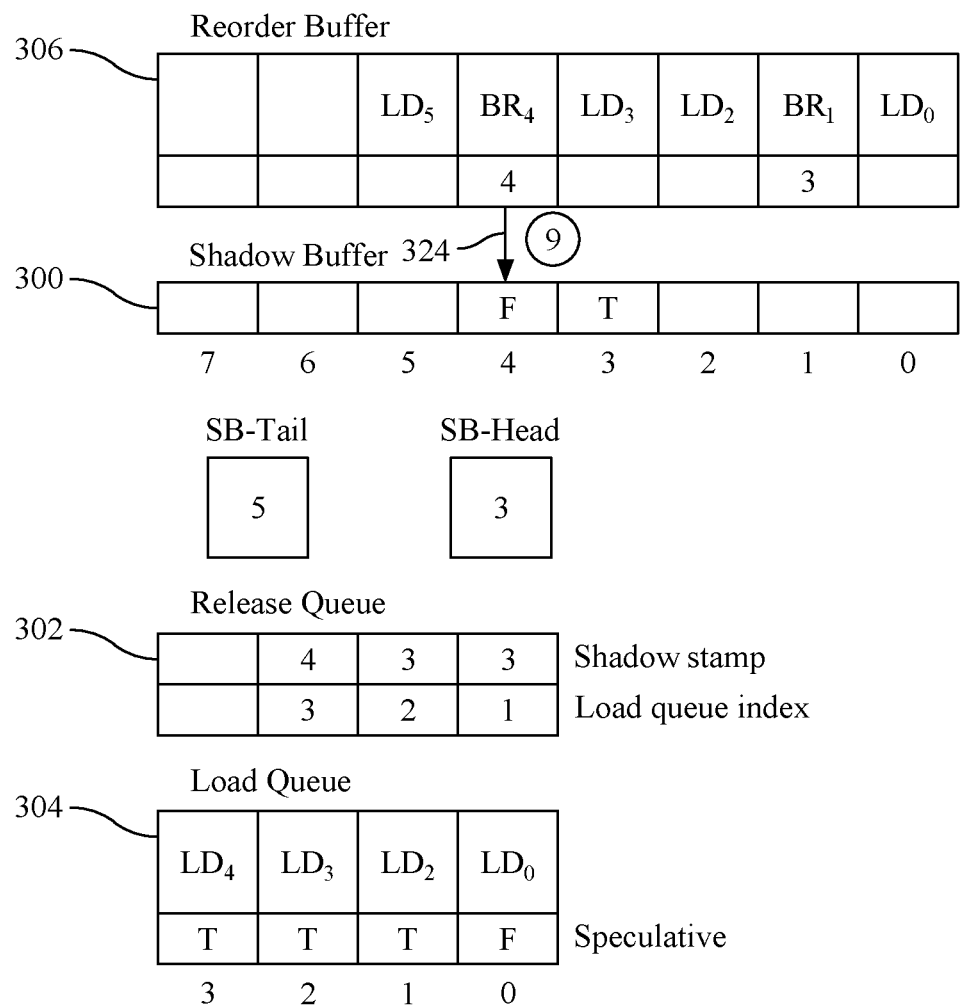
Figure 3F:
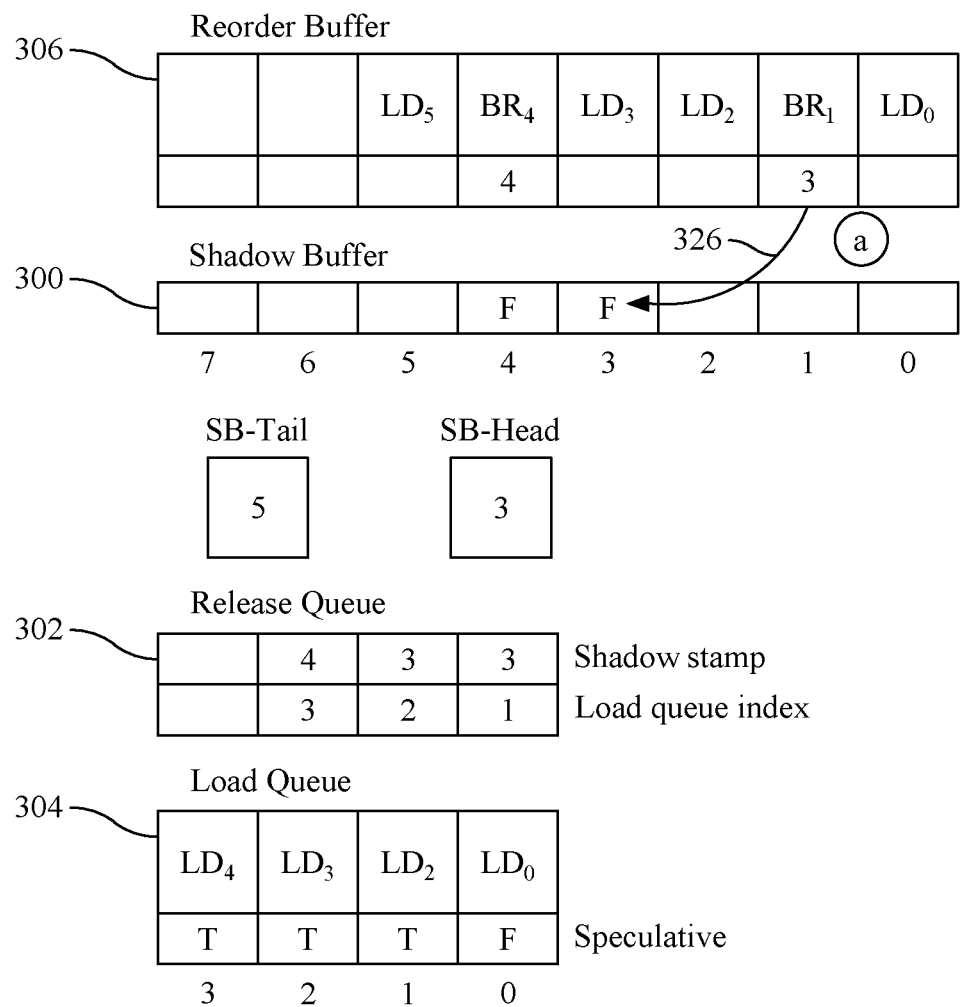
Figure 3G:
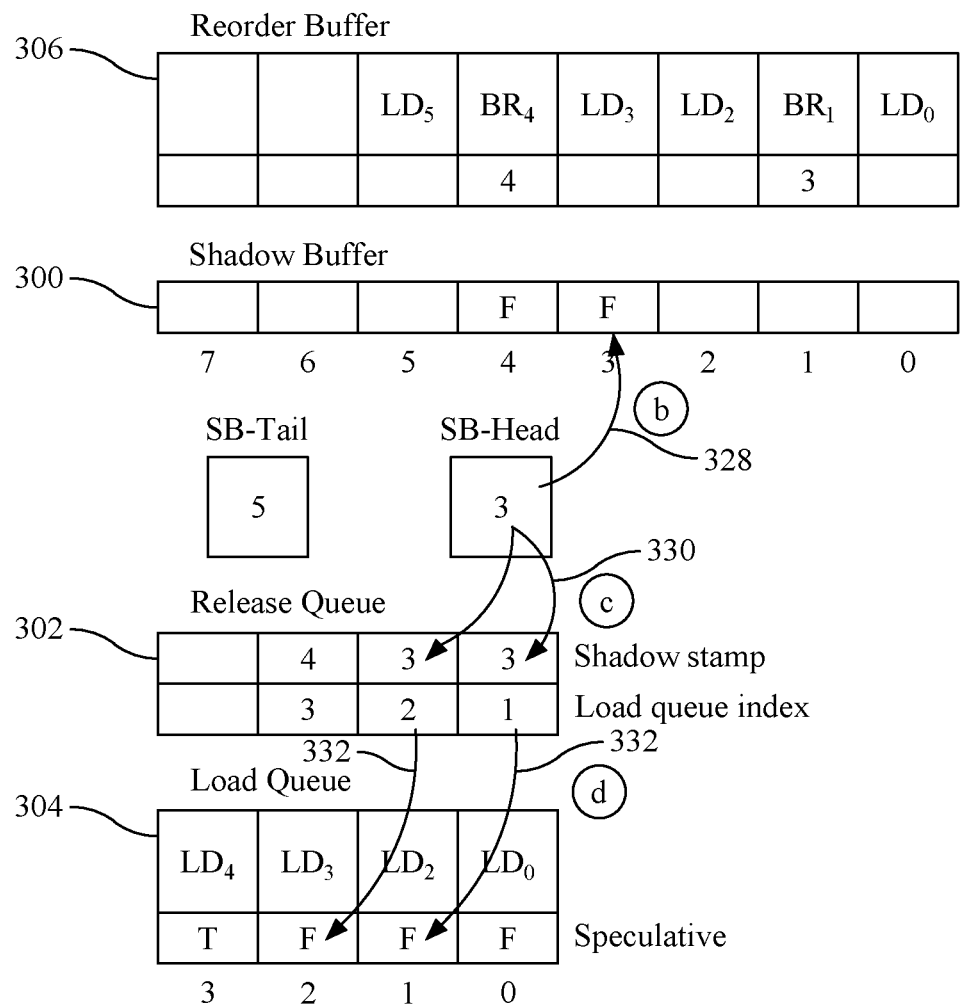
Figure 3H:
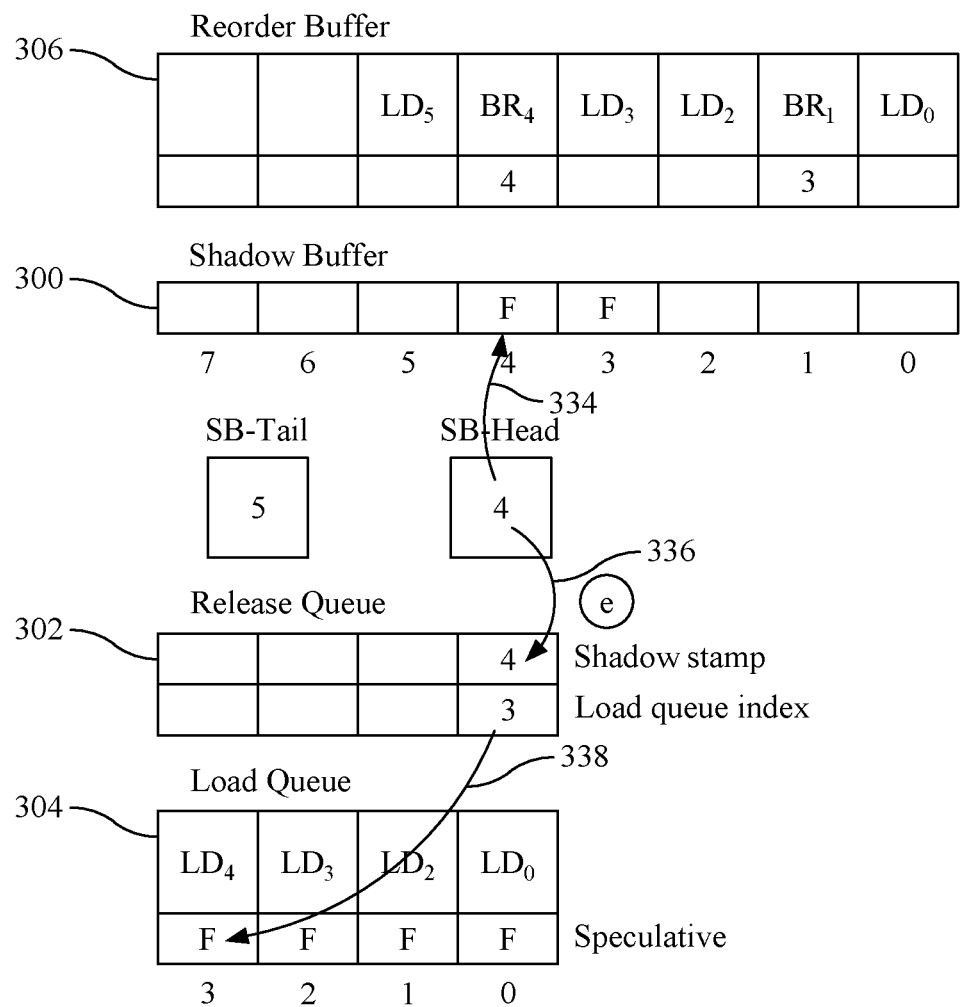

4. The just described steps are repeated for the following load LD3 (arrow 318), branch BR4 (arrow 320), and final load LD5 (arrow 322) as shown in FIG. 3(d).

5. Once a shadow-casting instruction, like the second branch instruction (BR4), stops casting a shadow, it updates the SB index that is indicated by the ROB 306 entry (FIG. 3(e), arrow 324). Nothing else happens at this point of time, since the SB-Head is still pointing to an older shadow-casting instruction that has not been executed.

6. Once the first branch (BR1) is resolved the SB entry is updated (FIG. 3(f), arrow 326).

7. This previous resolution triggers a number of events since it is the oldest shadow-casting instruction, as indicated by the SB-Head (FIG. 3(g), arrow 328). Before the SB-Head is incremented to indicate that instruction BR1 is no longer the oldest shadow-casting instruction, the SB-Head is compared with the first entries of the release queue 302 (FIG. 3(g), arrow 330). When the value of the SB-Head matches one or more values in the release queue 302, the load queue entries are updated to indicate that the loads are no longer under a speculative shadow (FIG. 3(g), arrows 332, changing value "T" to "F"). This operation repeats for every entry in the release queue 302 until a shadow stamp is encountered that does not match the SB-Head.

8. Once the SB-Head is incremented, the corresponding entry in the SB 300 is checked, causing the final load to be marked as non-speculative (FIG. 3(h), arrows 334, 336, 338).

9. Finally, the SB-Head is incremented, leaving the head equal to the tail, indicating that the SB is empty again (not shown in the illustration).

Value Prediction

According to some embodiments, a value-predicted or value re-computed delay-on-miss where the delay-on-miss solution is extended to provide values for cache misses for shadowed instructions through value prediction or value re-computation, instead of delaying those values while waiting for their instruction to have its shadows resolved as discussed above. In this context, predicted values can have at least these two properties:

Property 1: The predictor can be local to the core, isolated from other cores or even other execution contexts.

Property 2: Because the predicted value needs to be validated with a normal memory access, the predictor can be incorporated into an OoO pipeline with only small modifications to the cache and no modifications to the remaining memory hierarchy and the coherence protocol.

The first property allows the value predictor itself to be used during speculative execution without any visible side-effects. By delaying the memory access used to perform the validation of the prediction, loads that miss in the cache are value-predicted, while remaining completely invisible to the rest of the system.

Figure 4:
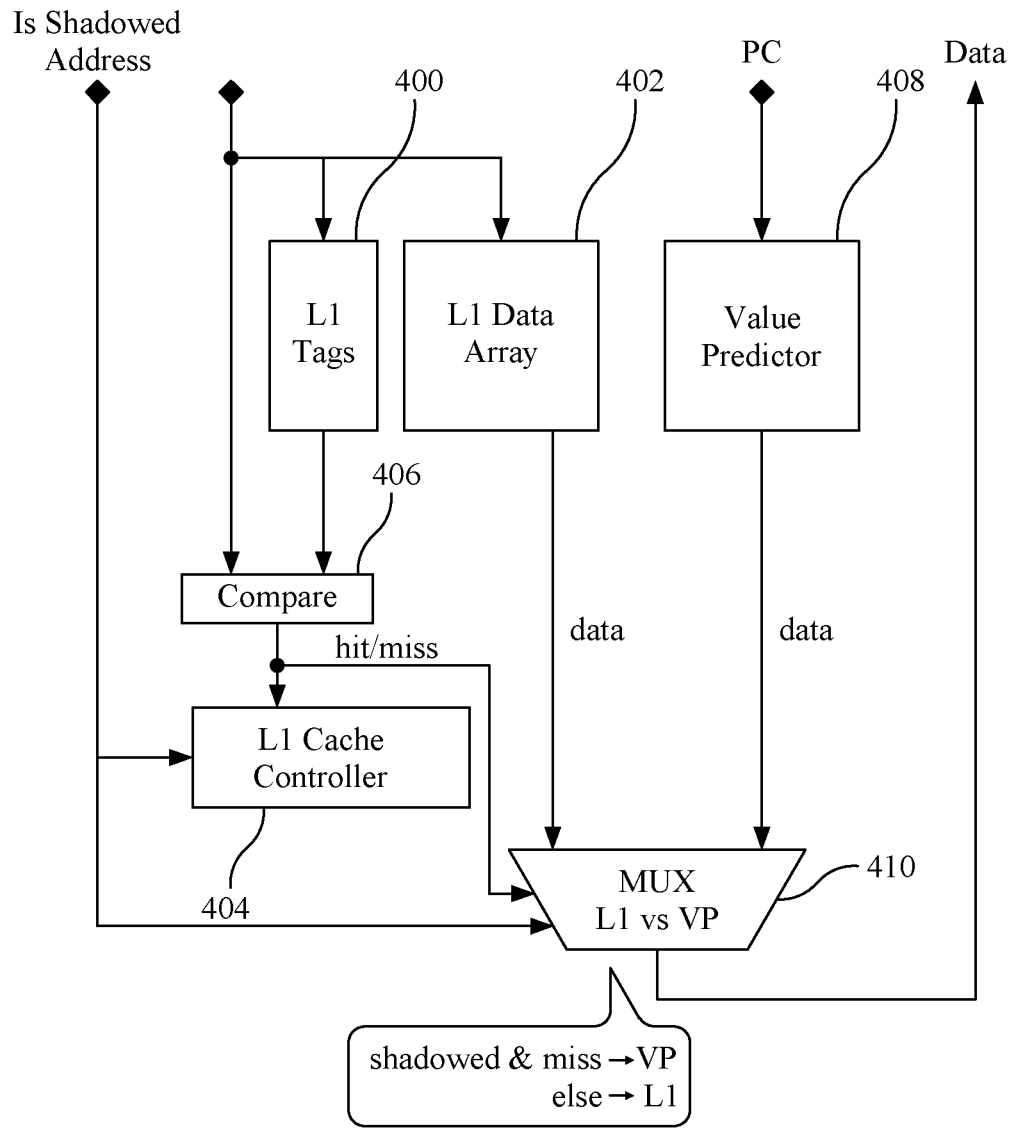
FIG. 4 depicts value prediction according to an embodiment.

The validation of the predicted values happens only after the speculation shadows have been resolved and it can be issued as a normal load. FIG. 4 presents an overview of a value prediction embodiment. Therein, the layer 1 (L1) cache includes L1 tags 400, L1 data 402 and an L1 cache controller 404. When an instruction accesses the memory system, the address of the desired data is compared in block 406 with the L1 tags 400 to determine whether the desired data is present in the L1 data array 402. The value predictor 408 is added as part of the cache and is queried in parallel. In case of a cache miss on a shadowed load, the value is returned by the value predictor 408 instead, if possible. Regardless of whether the access was resolved from the cache 402 or the value predictor 408, the cache controller 404 delays any side-effects until the CPU indicates that the speculation has been verified.

With value prediction in place, a new type of speculative shadow is introduced, the VP-Shadow. All value-predicted loads cast this shadow until the predicted value can be validated. In the total store order (TSO) memory model, the VP-Shadows are completely covered by the M-Shadows. If the M-Shadows were to be eliminated, either by relaxing the memory model or through some other approach, then the VP-Shadows are tracked to a finer granularity and selective replay is used instead of fully squashing in case of a value misprediction. The VP-Shadows are then restricted only to the instructions that would have to be selectively squashed and replayed, instead of all younger instructions. In one embodiment value predicted loads cast a shadow on all instructions until they are validated, and since a validation can only be issued when the load is no longer under a speculative shadow, only one validation at a time can be issued. In one embodiment this restriction is lifted if the M-Shadow is eliminated and the VP-Shadows are tracked for the instructions that depend on the predicted value.

Methods

Figure 5:
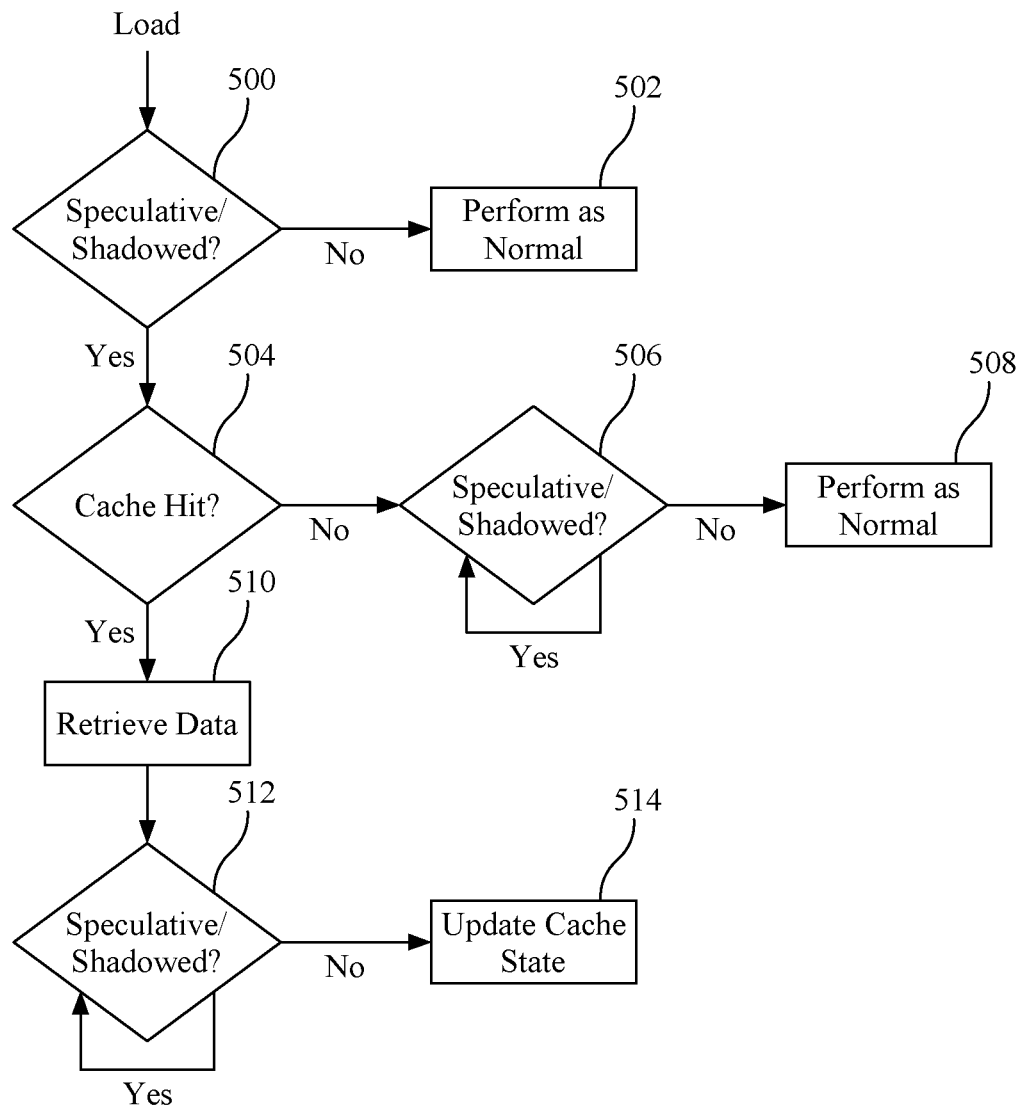
FIG. 5 is a flowchart showing a general method for shadow tracking instructions according to an embodiment.

Various embodiments are described above, both in terms of hardware and methodology for tracking the speculative status of instructions and changing the microarchitectural status of the cache when each instruction becomes non-speculative. The flow diagram of FIG. 5 illustrates the general methodology described above for a load instruction. Therein, if the load is determined, at block 500, to be nonspeculative and/or not shadowed, the load instruction is processed normally at block 502, i.e., the desired data is searched for at each cache level/main memory until found. If, on the other hand, the load is determined to be shadowed (by checking the SB), then the system determines whether the desired data is in the cache (e.g., L1 cache) at step 504. If the desired data is not in the cache, then the location of the desired data is delayed in block 506 until the speculative status of the load is resolved, i.e., all of the shadows are removed from the load, at which time normal operation resumes at step 508, i.e., search L2 cache, etc. Note that for embodiments which include value prediction, step 506 could also include that step.

If, on the other hand, step 504 determines that the desired data is in the cache, then the data is retrieved from the cache at step 510 and the updating of the cache state is delayed until the speculative status of the load is resolved, i.e., all of the shadows are removed from the load as indicated by steps 512 and 514. Note that although FIG. 5 depicts handling of a load instruction according to an embodiment, it is also applicable to the handling of any unsafe, i.e., speculative instruction.

Figure 6:
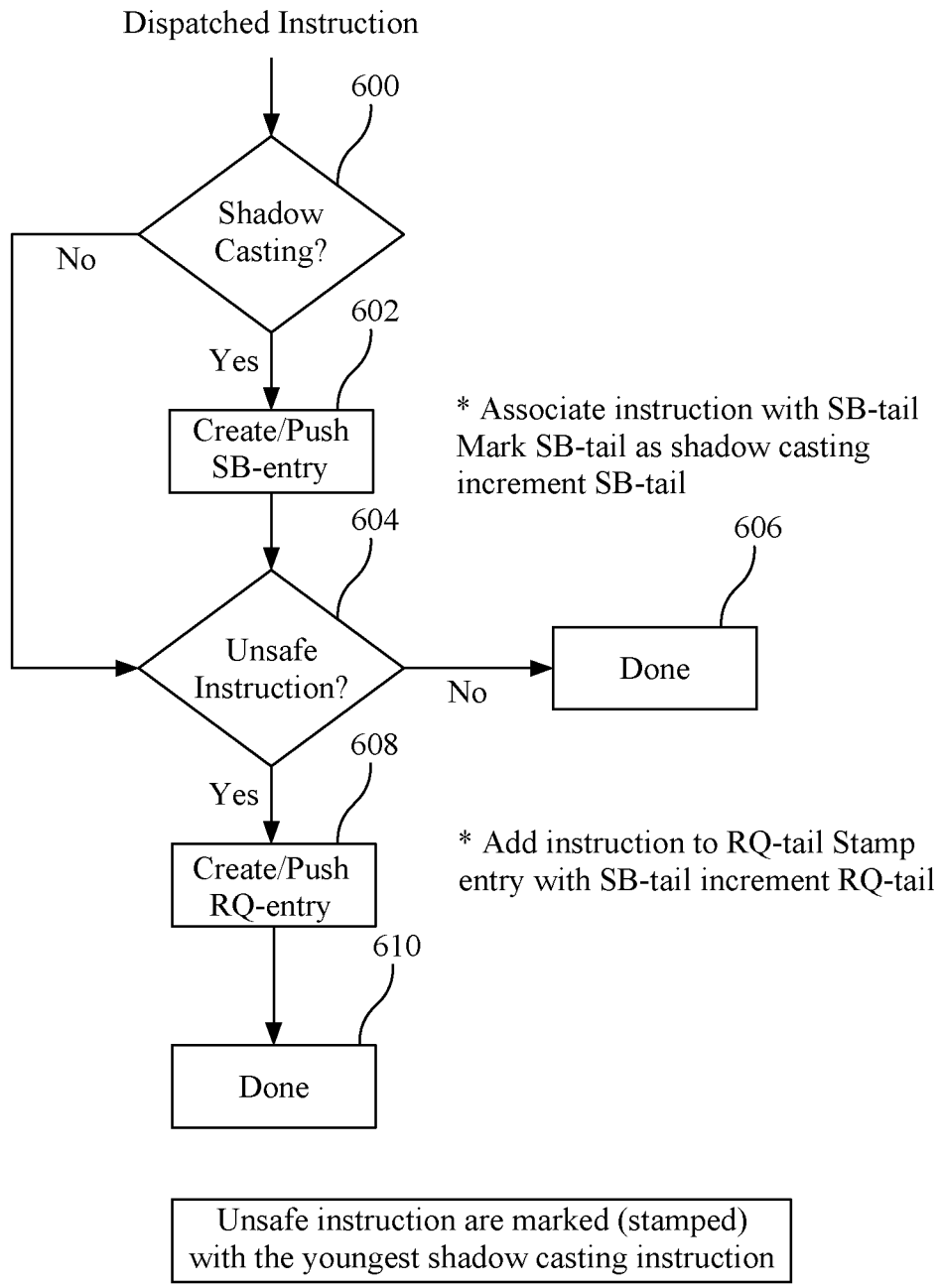
FIG. 6 is a flowchart showing how a dispatched instruction is handled according to an embodiment.

FIG. 6 is a flowchart illustrating how shadow casting and unsafe instructions are tracked at the time an instruction is dispatched according to an embodiment. Therein, when an instruction is dispatched to the ROB, it is first checked to see if any preceding instructions in the ROB cast a shadow on the dispatched instruction at step 600. If so, then the flow proceeds to step 602 where an entry is created in the shadow buffer to associated the dispatched instruction with the tail entry in the shadow buffer, and the shadow buffer tail is incremented. If the dispatched instruction does not have any shadows cast upon it by preceding instructions, or after the dispatched instruction is entered into the shadow buffer, the flow moves to step 604 where it is determined whether the dispatched instruction is unsafe, i.e., whether it is itself speculative. If not, the speculative evaluation of the dispatched instruction is complete and the flow moves to block 606. If the dispatched instruction is unsafe, then the flow moves to block 608 where an entry is created in the release queue which entry is stamped with the shadow buffer tail, such that the unsafe instruction is marked with the youngest shadow casting instruction, and the release queue tail is incremented. The flow then ends in step 610.

FIG. 7 is a flow chart illustrating steps associated with the process that occurs when a shadow is resolved, e.g., when a branch or store is executed, according to an embodiment. Therein at step 700 the shadow buffer is updated by marking the shadow buffer entry associated with the relevant instruction as not shadow casting any longer. Then, at step 702, it is determined whether the updated shadow buffer entry from step 700 is the head entry of the shadow buffer. If not, the process ends at step 704. However if the relevant shadow buffer entry is the head entry of the shadow buffer then the flow proceeds to step 706, where it is determined (for each entry of the release queue) whether the value of the shadow buffer head entry is equal to the value of the release queue entry. If so, then the instruction associated with that release queue entry is released for execution at step 708. This process continues until a release queue entry is identified which has a value which is different from the shadow buffer head entry. At this time the shadow buffer head entry is incremented at step 710. The flow then checks to see (at step 712) whether the new shadow buffer head entry is itself marked as shadow casting. If not the flow returns to check the release queue for potentially releasable instructions at step 710. If so, then the process is completed at step 714.

In the disclosed preferred embodiment of tracking shadows, the use of content-addressable memories (CAMs), which are both complex and costly to implement, is avoided. In other embodiments, use of CAM structures can achieve the same functionality.

The foregoing embodiments described for, among other things, systems and methods for the following.

An eager-delay where loads are only executed when they are no longer shadowed by another instruction.

A delay-on-miss where only loads that miss in the cache(s) are delayed. Loads that hit in the cache(s) are satisfied and only their side-effects in the cache(s) (e.g., updating replacement data or prefetching) are delayed.

Speculative change in the microarchitectural state of caches is prevented, in the prevailing speculative execution model, by requiring loads to reach the head of the ROB before they are issued. In this way, all loads are executed non-speculatively without the need for additional hardware complexity. This causes all loads to be serialized, thus, making it impossible to take advantage of any memory-level parallelism (MLP) available in the application. Instruction-level parallelism is equally crippled, as loads are necessary in order to feed data to the instructions. Naïvely executing all loads non-speculatively is not viable in out-of-order execution CPUs. The system and methods disclosed herein address this issue.

In one embodiment, instead of delaying every load until it reaches the head of the ROB, we track different speculative shadow types (Section 2) to release loads early. Loads are delayed only until they are no longer shadowed by other instructions, at which point they can be safely issued and executed out-of-order.

In another embodiment speculative loads are delayed to prevent any side-effects from appearing in the memory hierarchy. In comparison, other solutions, such as InvisiSpec, execute the loads and instead try to hide the side-effects until the speculation has been verified. While such an approach works, it requires modifications to the whole cache hierarchy, and it incurs a significant performance cost. In the disclosed systems and methods, this cost is reduced by reducing the scope of the side-effects that need to be hidden. By delaying cache misses (but not hits), the need is eliminated for an additional data structure that hides fetched cache lines until they can be installed in the cache. Additionally, since the cache line already exists in the cache(s) on a hit, no additional coherence mechanisms are required. Instead, only the side-effects of the hits are delayed, such as updating the replacement data and notifying the prefetcher, which exist outside the critical path of the cache access. The cache behavior for shadowed loads is as follows.

In case of a cache hit, the cache responds to the request but delays any operations that might cause visible side-effects, such as updating the replacement state. The CPU signals the cache to perform these operations after the speculation has been successfully verified.

In the case of a cache miss, the read request to the rest of the memory hierarchy is dropped. The cache misses caused by shadowed loads are shadowed cache misses.

A load that has received data from a cache while being shadowed and is now unshadowed, sends a release request to the cache, signaling that the cache can now perform any side-effect causing operations that the load has delayed while being speculative. On the other hand, a formerly shadowed load that has not received any data, repeats the initial memory request, this time triggering the normal miss mechanisms in the cache.

The translation lookaside buffers (TLB) can also be utilized as a potential side-channel in an attack. TLB misses are rare, with the majority of the workloads having a low miss ratio. TLB misses are handled with the delay-on-miss mechanism that is disclosed herein.

The delay-on-miss system and method, disclosed herein, reduces the number of delayed loads, but incurs stalls when encountering a shadowed cache miss. In lieu of delaying shadowed cache misses another embodiment continues the execution of loads that encounter a shadowed cache miss, by predicting their value.

To determine when a load is no longer covered by a shadow it is enough to first know which was the youngest shadow-casting instruction when the load entered the ROB and second check for when this shadow-casting instruction appears at the head of the SB and no longer casts a shadow, i.e., when the shadow-casting instruction exits the SB.

It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A processing system capable of speculative instruction execution comprising;
   a processor;
   a cache hierarchy of one or more levels and one or more cache memories per level;
   a memory system that supplies data to and receives data from the cache hierarchy and the processor;
   wherein the processor is connected to the first level of the cache hierarchy for loading and storing data; and
   wherein a memory accessing instruction which is speculatively issued for execution by the processor accesses the data without causing any change in a state of the cache hierarchy if the data are cached in a first level cache, or if the data become cached in the first level cache via another request not caused by said instruction;
   and wherein if the data are not cached in the first level cache, the memory accessing instruction, requests the data, no earlier than a time when said memory access instruction becomes non-speculative, and causes a miss in the first-level cache which is serviced by a remainder of the cache hierarchy or memory.

2. The processing system of claim 1, further comprising:
   a predictive value function which, when the requested data misses the first level cache and the memory accessing instruction remains speculative, provides a predicted value of the requested data to the processor.

3. The processing system of claim 1, further comprising:
a shadow buffer for marking the memory accessing instruction as speculative until the memory accessing instruction becomes non-speculative.

4. The processing system of claim 3, wherein the shadow buffer tracks all types of speculative instructions issued by the processor until they become non-speculative.

5. The processing system of claim 4, wherein the shadow buffer tracks only a subset of all types of speculation used by the processor for marking the memory accessing instruction as speculative until the memory accessing instruction becomes non-speculative with respect to the subset of all types of speculation that is tracked.

6. The processing system of claim 5, wherein the subset of all types of speculation includes one or more of: (a) memory operations with unknown addresses, arithmetic operations, and any other instructions that can cause an exception, (b) control flow instructions, including branches and jumps, when either a branch condition or target address are unknown or have been predicted but not yet verified, (c) potential data dependencies through stores with unresolved addresses, and (d) instructions for which when an execution of an older load is delayed then younger loads are allowed to execute speculatively, but can be squashed if an invalidation is received.

7. A processing system capable of speculative execution comprising:
a processor;
a cache hierarchy of one or more levels and one or more cache memories per level;
a memory system that supplies data to and receives data from the cache hierarchy and the processor;
wherein the processor is connected to the first level of the cache hierarchy for loading and storing data; and
wherein before a first instruction is speculatively issued by the processor for execution, the first instruction is associated with a second instruction;
the second instruction being a youngest instruction in an instruction window that is not retired and is capable of squashing the first instruction; and the first instruction is marked unsafe to execute and the second instruction is marked as shadow-casting; and
wherein when the oldest shadow casting instructing is no longer capable of squashing younger instructions, the association of unsafe instructions to said oldest shadow-casting instruction is checked and said oldest shadow casting instruction is unmarked as shadow casting and if an association exists between an unsafe instruction and said oldest shadow casting instruction, the unsafe instruction is marked as safe to execute.

8. The processing system of claim 7, wherein shadow casting instructions can be instructions which are categorized based on different types of speculative shadows which they cast on younger instructions, said different types of speculative shadows can be selected statically or dynamically for marking or non-marking according to a security versus performance trade off that is desired.

9. The processing system of claim 7, wherein an unsafe memory accessing instruction uses data that are cached, or become cached via another request not caused by said unsafe memory accessing instruction, in a first level cache without causing any change in the state of the cache; and wherein the unsafe memory accessing instruction requests from a first-level cache data that are not cached when said unsafe memory accessing instruction is marked as safe to execute.

10. The processing system of claim 8, wherein an unsafe memory accessing instruction uses data that are cached, or become cached via another request not caused by said unsafe memory accessing instruction, in a first level cache without causing any change in the state of the cache; and wherein the unsafe memory accessing instruction requests from a first-level cache data that are not cached when said unsafe memory accessing instruction is marked as safe to execute.

11. A method for managing a cache memory system comprising:
tracking a speculative status of a first memory accessing instruction being executed toward the cache memory system; and
making status changes to said cache memory system associated with execution of a second memory accessing instruction which follows the first instruction in a reorder buffer once the speculative status of the first memory accessing instruction is resolved.

12. The method of claim 11, wherein the step of tracking the speculative status of the first instruction further comprises:
marking the first memory accessing instruction in a buffer as speculative until the first memory accessing instruction becomes non-speculative.

13. The method of claim 11, wherein the step of making status changes to said cache memory system associated with execution of the second memory accessing instruction which follows the first memory accessing instruction in a reorder buffer once the speculative status of the first memory accessing instruction is resolved further comprises:
changing one or more of: contents of cache lines, replacement algorithm information, and updating of a prefetcher.

14. The method of claim 12, wherein the buffer tracks all types of speculative memory accessing instructions issued by the processor until they become non-speculative.

15. The method of claim 12, wherein the buffer tracks only a subset of all types of speculation used by the processor for marking the memory accessing instruction as speculative until the memory accessing instruction becomes non-speculative with respect to the subset of all types of speculation that is tracked.

16. The method of claim 15, wherein the subset of all types of speculation includes one or more of: (a) memory operations with unknown addresses, arithmetic operations, and any other instructions that can cause an exception, (b) control flow instructions, including branches and jumps, when either a branch condition or target address are unknown or have been predicted but not yet verified, (c) potential data dependencies through stores with unresolved addresses, and (d) instructions for which when an execution of an older load is delayed then younger loads are allowed to execute speculatively, but can be squashed if an invalidation is received.

* * * * *